455-615 AU 233 EX

FIP8106 OR 3,284,633

Examir

Nov. 8, 1966 J. L. HATHAWAY 3,284,633

SIGNAL TRANSMISSION AND RECEPTION SYSTEM COMPRISING FREQUENCY MODULATED LIGHT BEAM

Filed Dec. 24, 1963

INVENTOR.
JARRETT L. HATHAWAY
BY
Floyd M. Harris
Attorney

United States Patent Office 3,284,633

Patented Nov. 8, 1966

3,284,633

SIGNAL TRANSMISSION AND RECEPTION SYSTEM COMPRISING FREQUENCY MODULATED LIGHT BEAM

Jarrett Lewis Hathaway, Manhasset, N.Y., assignor to Radio Corporation of America, a corporation of Delaware Filed Dec. 24, 1963, Ser. No. 333,112
8 Claims. (Cl. 250—199)

My invention relates to an improved communication system and particularly to a novel system in which information is transmitted by a modulated light beam.

It has been a common practice to utilize radio microphones in situations where the use of microphone cables is impractical. A large political convention is an example of such a situation. A difficulty in utilizing radio transmission in such situations is that there may be considerable interference due both to noise from electrical devices and to interference between closely crowded radio channels.

An object of the invention is to provide an improved communication transmitter that is small and easily carried by a person.

A further object of the invention is to provide an improved communication system which utilizes a modulated light beam.

In practicing a preferred embodiment of the invention, a light beam (which preferably is invisible) is intensity-modulated by a frequency modulated signal to be transmitted. The source of light preferably is a glow discharge lamp such as an argon lamp. It may be noted that a glow discharge lamp is one in which a glow discharge takes place in a low-pressure gas or vapor. The light is intensity modulated by a frequency modulated signal that is at least approximately sine wave in form, as distinguished from a pulse wave form, so that most of the energy radiated by the lamp is utilized at the receiver. As a result, maximum distance of transmission is obtained for a given size of glow lamp and associated transmitting apparatus.

The invention will be described in detail with reference to the accompanying drawings in which.

Figures 1, 2, 3, 4, 5:
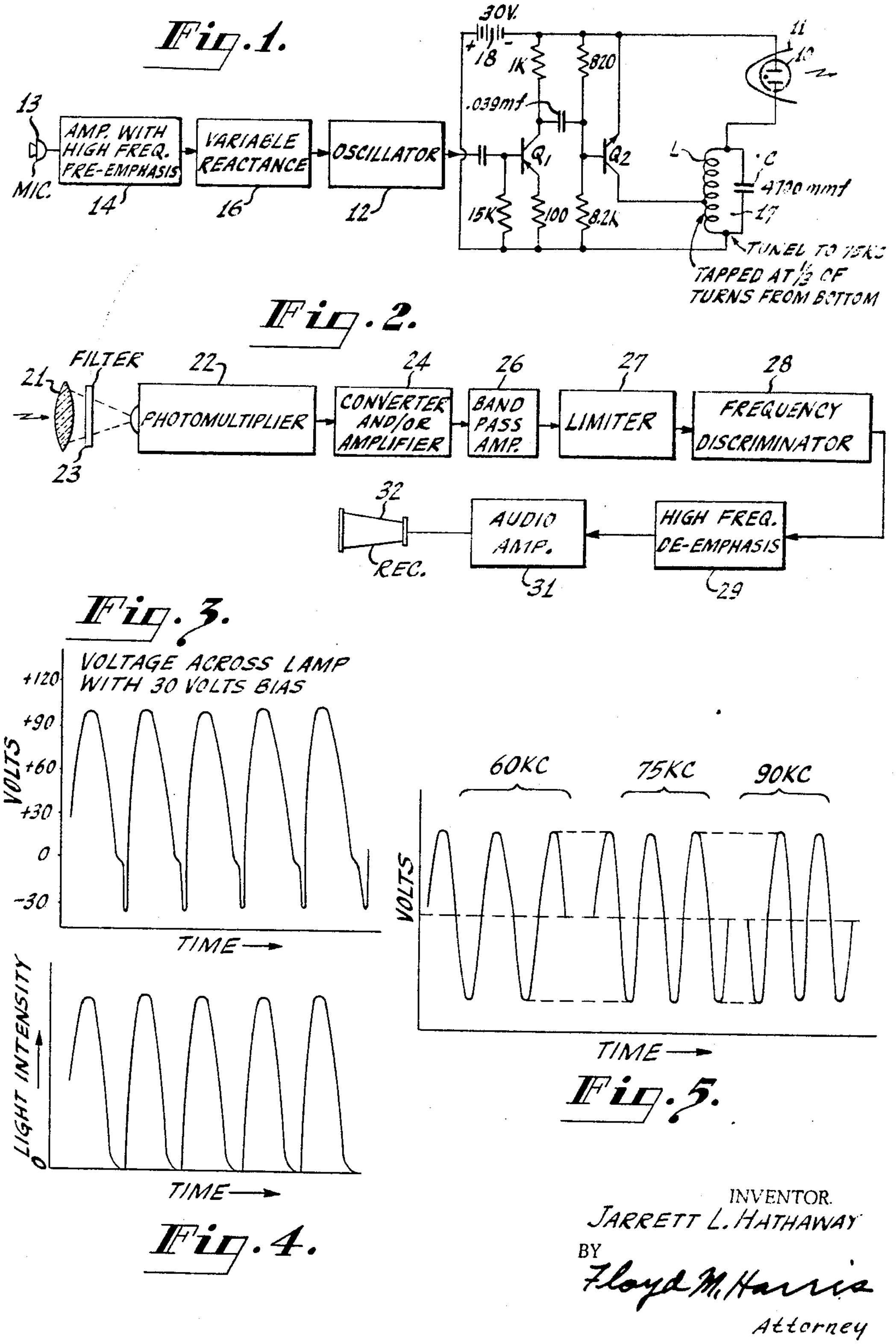
FIG. 1 is a schematic and block diagram of a transmitter embodying the invention.
FIG. 2 is a block diagram of a receiver designed for use in a system embodying the invention, and designed particularly for use with the transmitter of FIG. 1.
FIGS. 3, 4, and 5 are graphs that are referred to in explaining the invention.

Refer to FIG. 1. The light beam to be modulated is provided by a glow lamp 10, such as an argon lamp, the light from which is radiated in all directions or which is beamed by an optical system such as a reflector 11. In the present example, the lamp 10 is a two watt cold cathode argon lamp, type AR1 sold by the General Electric Company. A signal approximating a sine wave, frequency modulated by speech, according to the present example, is applied to the lamp 10. Such a wave is illustrated in FIG. 3. A bias voltage is also applied to the lamp 10 so that the glow is always from one electrode of the lamp, i.e., the polarity of voltage across the lamp 10 does not reverse sufficiently to ignite the other electrode (which would give frequency doubling). Thus, the modulation of the light beam is at the same frequency as that of the applied signal. Also, the wave form of the modulated light beam is at least approximately sinusoidal in wave form.

The apparatus for applying the frequency modulated sine wave to the lamp 10 comprises an oscillator 12 which, in this example, operates at 75,000 cycles per second (75 kc.) in the absence of modulation. The oscillator 12 is frequency modulated by signal, such as speech signal, from a microphone 13. The speech signal is amplified by an amplifier 14, preferably with high frequency premphasis, to the proper level for a variable reactance circuit 16 connected to vary the reactance of the oscillator 12 tank circuit and thus to frequency modulate the oscillator 12 plus and minus 15 kc.

It has been found that the output of the oscillator departs substantially from a sinusoidal wave form. Because of this, and also for providing the desired power, the oscillator output is amplified and fed into a tuned circuit 17 comprising an inductor L and a capacitor C which is tuned to 75 kc. The amplification is provided by an amplifier receiving oscillator 12 output and comprising a PNP type transistor Q1, and an amplifier receiving the output of the Q1 amplifier and comprising an NPN type transistor Q2. By feeding the amplified oscillator output into the tuned circuit 17 there is obtained the desired power, and a voltage wave-form which is as near to a sine wave as can be achieved under the loading conditions imposed by the glow discharge lamp. This voltage, together with a D.-C. bias, is impressed across the glow lamp 10.

The D.-C. bias voltage for lamp 10 is provided by the 30 volt D.-C. supply 18 for the transistors Q1 and Q2. It is evident that the tuned circuit 17 is driven by the current from transistor Q2 flowing from the positive terminal of supply 18 through the lower section of inductor L, through the collector and emitter of Q2, and back to the supply 18. Also, it is evident that the frequency modulated signal applied to the lamp 10 is the voltage appearing across the tuned circuit 17, i.e., across the entire inductor L. The supply voltage 18 is in series with this modulated signal and the lamp 10. In the present example, the peak-to-peak amplitude of the signal across tuned circuit 17 is about 135 volts. When the signal is maximum positive at the top of circuit 17, the voltage across the lamp 10 is about 100 volts as shown in FIG. 3. When the signal is maximum negative at the top of circuit 17, the voltage across lamp 10 is about minus 35 volts (as shown in FIG. 3), which is below the ignition voltage for the lamp.

The voltage of FIG. 3 appearing across the lamp 10 was measured by an oscilloscope connected across the lamp 10. The wave illustrated in FIG. 4 represents the light output from the argon lamp 10 produced by the electrical wave of FIG. 3. This light output measurement was made by an oscilloscope connected across the output circuit of the photomultiplier.

The light radiated from the argon lamp 10 is almost entirely within the band from 3000 to 4000 angstroms. In the 4000 angstrom region it is visible blue light which is filtered out at the receiver. It is desirable to filter out at the receiver all interfering visible light such as that produced by fluorescent and incandescent lamps illuminating a convention hall, for example.

The receiver is illustrated in FIG. 2. The light beam from the transmitter is received by an optical lens system indicated at 21 which gathers light from the transmitter over a sizable area and focuses it on the photocathode of a photomultiplier 22. The lens system 21 preferably is highly directive to avoid interference effects from other sources of light. A filter 23 is interposed between the lens 21 and the photomultiplier 22 to filter out all visible light and infrared radiation picked up by the lens, and to pass only the invisible ultra-violet wavelengths. This filter 23 may be physically located ahead of the lens if desired. The electrical signal of the photomultiplier 22 is amplified by an amplifier 24 and passed through a bandpass amplifier 26, a limiter 27 and a frequency discriminator 28. The audio signal (speech in this example) appearing at the discriminator output is applied to a circuit 29 which provides high frequency deemphasis. The signal is then amplified by an audio amplifier 31 and applied to a telephone receiver 32 or to a loud speaker or any desired utilization circuit.

The photomultiplier is preferably of a type that is sensitive to ultraviolet light and insensitive to light of longer wavelengths. Instead of a photomultiplier, any suitable type of low-noise fast-response light detector may be substituted.

The receiver may be of the superheterodyne type, in which case the unit 24 is a converter. The converter may step up the 75 kc. signal to 455 kc., for example. The bandpass amplifier is then designed to pass the band of frequencies from 455 kc. minus 15 kc. to 455 kc. plus 15 kc.

The bandpass amplifier 26 preferably has a pass band just wide enough to pass the frequency modulated signal. In the present example where 75 kc. is frequency modulated to a maximum frequency swing of plus and minus 15 kc., the frequency range is from 60 kc. to 90 kc. Therefore, the bandpass amplifier has a high frequency cutoff point a little above 90 kc. and a low frequency cutoff point a little below 60 kc. As an example of the cutoff points, the bandpass amplifier characteristic may be such that the transmission characteristics is flat from 60 kc. to 90 kc. and down 6 db at 58 kc. and at 92 kc. The output signal of the bandpass amplifier is substantially sinusodial in wave form.

In operation, the intensity of the light emitted by the lamp 10 follows closely the wave form of a sine wave. Therefore, the output signal from the photomultiplier 22 is a frequency modulated sine wave, as illustrated in FIG. 5. In the event there is any clipping or flattening of the sine wave, the resulting harmonic frequencies are filtered out by the bandpass filter 26 so that its output is sinusoidal in wave form.

From the foregoing it will be seen that most of the light beam energy reaching the light gathering lens 21 is utilized by the receiver for conversion into sound at the receiver 32. In particular, the modulated light beam does not contain a high percentage harmonic frequency content, as in the case of a modulated pulsed light beam for example, which would be discarded at the receiver because of its bandpass characteristic. Such a bandpass characteristic is desirable in FM receivers in order to reduce spurious noise ahead of the amplitude limiter.

In FIG. 1 some of the circuit values are indicated merely by way of example. Resistances are given either in ohms or in thousands of ohms. Capacitance is given either in microfarads or in micromicrofarads.

What is claimed is:

1. A transmitter for transmitting information by modulated light, said transmitter comprising means for producing a continuous wave voltage that is frequency modulated in accordance with the information to be transmitted, a glow discharge lamp, and means for applying said frequency modulated voltage to said lamp for intensity modulating its light output, said voltage wave having a frequency sufficiently low so that said glow lamp can become extinguished once per cycle.

2. A transmitter for transmitting information by modulated light, said transmitter comprising means for producing a carrier wave voltage that is frequency modulated in accordance with information to be transmitted, a source of light that can be intensity modulated by said frequency modulated voltage, means for causing said light source to radiate light that is intensity modulated so as to have a wave form that is substantially a sine wave that is frequency modulated by the information to be transmitted, said last means including means for applying said frequency modulated voltage to said light source, said carrier voltage wave having a frequency sufficiently low so that said source of light can become extinguished once per cycle thereof.

3. In combination, a transmitter comprising a source of ultraviolet light which is radiated toward a receiver, means for producing a carrier wave voltage that is frequency modulated, said means comprising an oscillator and further comprising means for frequency modulating said oscillator by information that is to be transmitted, means for applying said frequency modulated voltage to said light source and for also applying to said light source a D.-C. bias voltage having a value such that the voltage across said light source does not reverse in polarity sufficiently to cause the source of light to emit, to substantially sinusoidally intensity modulate said light in accordance with said frequency modulated voltage, said carrier voltage wave having a frequency sufficiently low so that said light source can become extinguished once per cycle thereof.

4. In combination, a transmitter comprising a glow discharge lamp for producing light which is to be radiated toward a receiver, means for producing a carrier wave voltage that is frequency modulated, said means comprising an oscillator and further comprising means for frequency modulating said oscillator by information that is to be transmitted, means for applying said frequency modulated voltage to said light source, and for also applying to said light source a D.-C. bias voltage having a value such that the voltage across said lamp does not reverse in polarity far enough to cause light to be emitted during this portion of the cycle, to substantially sinusoidally intensity modulate said light in accordance with said frequency modulated voltage, said carrier voltage wave having a frequency sufficiently low so that said light source can become extinguished once per cycle thereof.

5. A transmitter comprising a source of light which is to be radiated toward a receiver, means for producing a carrier wave that is frequency modulated, said means comprising an oscillator and further comprising means for frequency modulating said oscillator by information that is to be transmitted, an amplifier having an output circuit tuned to the center frequency of said frequency modulated carrier wave, means for applying said frequency modulated carrier wave through said amplifier and tuned output circuit to said light source and for also applying to said light source a D.-C. bias voltage having a value such that the voltage across said light source does not reverse in polarity with sufficient amplitude to cause said light source to emit, to substantially sinusoidally intensity modulate said light in accordance with said frequency modulated voltage, said carrier wave having a frequency that is sufficiently low so that said light source can become extinguished once per cycle thereof.

6. A transmitter comprising a source of ultraviolet light which is to be radiated toward a receiver, means for producing a carrier wave that is frequency modulated, said means comprising an oscillator and further comprising means for frequency modulating said oscillator by information that is to be transmitted, an amplifier having an output circuit tuned to the center frequency of said frequency modulated carrier wave, means for applying said frequency modulated carrier wave through said amplifier and tuned output circuit to said light source and for also applying to said light source a D.-C. bias voltage having a value such that the voltage across said light source does not reverse in polarity with sufficient amplitude to cause more than one cycle of light emission per cycle of electrical signal, to substantially sinusoidally intensity modulate said light in accordance with said frequency modulated amplifier output, said carrier wave having a frequency sufficiently low so that said light source can become extinguished once per cycle thereof.

7. In combination, a transmitter comprising a source of light which is to be radiated toward a receiver, means for producing a carrier wave voltage that is frequency modulated, said means comprising an oscillator and further comprising means for frequency modulating said oscillator by information that is to be transmitted, the frequency of said oscillator being swung between a maximum frequency and a minimum frequency, means for applying said frequency modulated voltage to said light source and for also applying to said light source a D.-C. bias voltage having a value such that the voltage across said light source does not reverse in polarity with sufficient amplitude to cause more than one cycle of light emission per cycle of frequency modulated voltage, to sinusoidally intensity modulate said light in accordance with said frequency modulated voltage, said carrier wave being of so low a frequency that said light source can become extinguished once per cycle thereof, a receiver for receiving said intensity modulated light, said receiver comprising means for converting said received light to a frequency modulated voltage, a bandpass circuit to which said last-mentioned voltage is applied, said bandpass circuit having a passband to pass substantially only the frequencies lying between a frequency slightly above said maximum frequency and a frequency slightly below said minimum frequency, and a frequency discriminator connected to receive the output signal from said bandpass circuit whereby said transmitted information appears at the frequency discriminator output circuit.

8. In combination, a transmitter comprising a source of ultra-violet light which is to be radiated toward a receiver, means for producing a carrier wave voltage that is frequency modulated, said means comprising an oscillator and further comprising means for frequency modulating said oscillator by information that is to be transmitted, the frequency of said oscillator being swung between a maximum frequency and a minimum frequency, means for applying said frequency modulated voltage to said light source and for also applying to said light source a D.-C. bias voltage having a value such that the voltage across said light source does not reverse in polarity with sufficient amplitude to cause more than one cycle of light emission per cycle of frequency modulated voltage, to sinusoidally intensity modulate said light source in accordance with said frequency modulated voltage, said carrier wave being of so low a frequency that said light source can become extinguished once per cycle thereof, a receiver for receiving said intensity modulated light and including a filter for passing substantially only said ultraviolet light, said receiver comprising means for converting said received and filtered light to a frequency modulated voltage, a bandpass circuit to which said last-mentioned voltage is applied, said bandpass circuit having a passband to pass substantially only the frequencies lying between a frequency slightly above said maximum frequency and a frequency slightly below said minimum frequency, and a frequency discriminator connected to receive the output signal from said bandpass circuit whereby said transmitted information appears at the frequency discriminator output circuit.

References Cited by the Examiner

UNITED STATES PATENTS

| | | | |
|---|---|---|---|
| 2,032,588 | 3/1936 | Miller | 250—199 |
| 2,395,738 | 2/1946 | Hanson et al. | 325—427 X |
| 2,858,421 | 10/1958 | Touvet | 250—199 |
| 3,087,065 | 4/1963 | Mutschler | 250—199 |

FOREIGN PATENTS

| | | |
|---|---|---|
| 776,129 | 6/1957 | Great Britain. |

DAVID G. REDINBAUGH, *Primary Examiner.*

JOHN W. CALDWELL, *Examiner.*